(12) United States Patent  
Kawamata

(10) Patent No.: US 12,671,909 B2  
(45) Date of Patent: Jun. 30, 2026

(54) IMAGE GENERATION APPARATUS AND IMAGE GENERATION METHOD

(71) Applicant: SONY SEMICONDUCTOR SOLUTIONS CORPORATION, Kanagawa (JP)

(72) Inventor: Daisuke Kawamata, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 273 days.

(21) Appl. No.: 18/256,459

(22) PCT Filed: Dec. 10, 2021

(86) PCT No.: PCT/JP2021/045488  
§ 371 (c)(1),  
(2) Date: Jun. 8, 2023

(87) PCT Pub. No.: WO2022/138226  
PCT Pub. Date: Jun. 30, 2022

(65) Prior Publication Data

US 2024/0031684 A1 Jan. 25, 2024

(30) Foreign Application Priority Data

Dec. 23, 2020 (JP) ................................. 2020-213546

(51) Int. Cl.  
*H04N 23/741* (2023.01)  
*G06T 15/50* (2011.01)  
(Continued)

(52) U.S. Cl.  
CPC ........... *H04N 23/741* (2023.01); *G06T 15/50* (2013.01); *G06T 19/00* (2013.01); *H04N 23/12* (2023.01);  
(Continued)

(58) Field of Classification Search  
CPC .... H04N 23/741; H04N 23/12; H04N 25/772; H04N 25/11; H04N 23/64; G06T 15/50; G06T 19/00  
See application file for complete search history.

(56) References Cited

U.S. PATENT DOCUMENTS

| | | | |
|---|---|---|---|
| 6,603,878 B1 * | 8/2003 | Takemoto ................. | G06T 5/75 358/521 |
| 6,738,510 B2 * | 5/2004 | Tsuruoka ............. | H04N 23/667 358/521 |

(Continued)

FOREIGN PATENT DOCUMENTS

| | | |
|---|---|---|
| CN | 103679784 A | 3/2014 |
| CN | 107896307 A | 4/2018 |

(Continued)

OTHER PUBLICATIONS

International Search Report and Written Opinion of PCT Application No. PCT/JP2021/045488, issued on Feb. 1, 2022, 09 pages of ISRWO.

*Primary Examiner* — Charles L Beard  
(74) *Attorney, Agent, or Firm* — XSENSUS LLP

(57) ABSTRACT

Provided is an image generation unit that generates a plurality of simulation images in which a plurality of images having different accumulation times is reproduced on the basis of a physical quantity corresponding to light applied to an image sensor, and an HDR synthesis unit performs HDR synthesis on a plurality of simulation images.

9 Claims, 8 Drawing Sheets

(51) Int. Cl.

| | | |
|---|---|---|
| *G06T 19/00* | (2011.01) | |
| *H04N 23/12* | (2023.01) | |
| *H04N 23/60* | (2023.01) | |
| *H04N 25/11* | (2023.01) | |
| *H04N 25/772* | (2023.01) | |

(52) U.S. Cl.
CPC ............. *H04N 23/64* (2023.01); *H04N 25/11*
(2023.01); *H04N 25/772* (2023.01)

(56) References Cited

U.S. PATENT DOCUMENTS

| | | | | |
|---|---|---|---|---|
| 7,146,059 B1* | 12/2006 | Durand | G06T 5/90 | 382/274 |
| 7,409,104 B2* | 8/2008 | Vitsnudel | G06T 5/50 | 382/284 |
| 7,480,421 B2* | 1/2009 | Henley | G06T 5/50 | 382/274 |
| 8,014,445 B2* | 9/2011 | Segall | H04N 19/61 | 375/240.01 |
| 8,218,625 B2* | 7/2012 | Ward | H04N 19/463 | 375/240.03 |
| 8,339,475 B2* | 12/2012 | Atanassov | G06T 5/40 | 348/229.1 |
| 9,240,049 B2* | 1/2016 | Ciurea | G06T 7/85 | |
| 9,338,371 B2* | 5/2016 | Sano | H04N 23/11 | |
| 9,998,692 B1* | 6/2018 | Griffiths | H04N 25/585 | |
| 10,609,286 B2* | 3/2020 | Hold-Geoffroy | G06V 10/764 | |
| 10,706,512 B2* | 7/2020 | Ma | H04N 23/10 | |
| 10,884,772 B1* | 1/2021 | Snir | G06T 1/20 | |
| 11,012,630 B1* | 5/2021 | Noguchi | H04N 23/73 | |
| 11,017,561 B1* | 5/2021 | Sonn | G06T 7/70 | |
| 11,022,839 B2* | 6/2021 | Ishii | G09G 3/2092 | |
| 11,055,827 B2* | 7/2021 | Bouzaraa | G06T 5/90 | |
| 11,107,204 B2* | 8/2021 | Unger | H04N 1/6027 | |
| 11,164,014 B1* | 11/2021 | Ghadiok | G06N 3/045 | |
| 11,475,549 B1* | 10/2022 | Kumar | G06T 5/92 | |
| 11,475,766 B1* | 10/2022 | Carson | G06F 16/447 | |
| 11,935,285 B1* | 3/2024 | Cao | G06T 5/92 | |
| 2002/0006230 A1* | 1/2002 | Enomoto | G06T 5/40 | 382/274 |
| 2003/0053099 A1* | 3/2003 | Sakaguchi | H04N 1/00267 | 358/1.9 |
| 2004/0070778 A1* | 4/2004 | Matama | G06T 5/75 | 358/1.9 |
| 2005/0041844 A1* | 2/2005 | Yamanaka | G06T 7/0012 | 382/128 |
| 2005/0254722 A1* | 11/2005 | Fattal | G06T 5/92 | 382/162 |
| 2006/0115152 A1* | 6/2006 | Tsuchiya | H04N 5/20 | 348/E5.064 |
| 2007/0040914 A1* | 2/2007 | Katagiri | H04N 23/76 | 348/E5.041 |
| 2007/0165112 A1* | 7/2007 | Shinmei | G06T 5/70 | 348/E5.079 |
| 2007/0181687 A1* | 8/2007 | Fukushima | H04N 23/68 | 348/E5.045 |
| 2008/0002908 A1* | 1/2008 | Chinen | G06T 5/70 | 382/274 |
| 2008/0094486 A1* | 4/2008 | Fuh | H04N 23/70 | 348/229.1 |
| 2008/0122953 A1* | 5/2008 | Wakahara | G06T 7/13 | 348/241 |
| 2009/0101798 A1* | 4/2009 | Yadid-Pecht | H04N 25/531 | 250/214 A |
| 2009/0102945 A1* | 4/2009 | Chen | H04N 23/741 | 348/229.1 |
| 2009/0102946 A1* | 4/2009 | Tischer | H04N 23/70 | 348/222.1 |
| 2009/0295941 A1* | 12/2009 | Nakajima | G06T 5/40 | 348/229.1 |
| 2010/0110180 A1* | 5/2010 | Tonogai | H04N 23/741 | 348/136 |
| 2010/0195901 A1* | 8/2010 | Andrus | H04N 23/741 | 382/168 |
| 2010/0310190 A1* | 12/2010 | Lin | H04N 25/58 | 348/241 |
| 2011/0050946 A1* | 3/2011 | Lee | H04N 25/76 | 348/222.1 |
| 2011/0069189 A1* | 3/2011 | Venkataraman | H04N 23/90 | 348/E5.024 |
| 2011/0080487 A1* | 4/2011 | Venkataraman | G06T 7/557 | 348/E5.024 |
| 2011/0122308 A1* | 5/2011 | Duparre | H10F 39/8053 | 348/340 |
| 2011/0141325 A1* | 6/2011 | Nakajima | H04N 17/002 | 348/E5.079 |
| 2011/0176028 A1* | 7/2011 | Toyoda | H04N 25/589 | 382/274 |
| 2011/0188744 A1* | 8/2011 | Sun | G06T 5/94 | 382/162 |
| 2011/0292469 A1* | 12/2011 | Takahashi | H04N 1/1938 | 358/474 |
| 2013/0003086 A1* | 1/2013 | Mebane | H04N 1/6027 | 358/1.9 |
| 2013/0021510 A1* | 1/2013 | Sambonsugi | H04N 25/77 | 348/E5.091 |
| 2013/0120607 A1* | 5/2013 | Manabe | H04N 9/76 | 348/222.1 |
| 2013/0147979 A1* | 6/2013 | McMahon | H04N 25/44 | 348/218.1 |
| 2014/0063330 A1* | 3/2014 | Matsuyama | H04N 23/673 | 348/352 |
| 2014/0064632 A1* | 3/2014 | Manabe | H04N 23/951 | 382/254 |
| 2014/0168249 A1* | 6/2014 | Rempel | H04N 9/3126 | 345/589 |
| 2014/0218559 A1* | 8/2014 | Yamaguchi | H04N 23/70 | 348/229.1 |
| 2014/0347521 A1* | 11/2014 | Hasinoff | H04N 5/265 | 348/239 |
| 2015/0116525 A1* | 4/2015 | Peng | G06T 5/50 | 348/218.1 |
| 2015/0170389 A1* | 6/2015 | Ming | G06T 5/50 | 382/284 |
| 2015/0172528 A1* | 6/2015 | Maeyama | H04N 25/589 | 348/362 |
| 2015/0341620 A1* | 11/2015 | Han | B60R 1/24 | 701/99 |
| 2015/0350510 A1* | 12/2015 | Han | H04N 7/18 | 348/229.1 |
| 2015/0356904 A1* | 12/2015 | Nakatani | G09G 5/377 | 345/690 |
| 2016/0255356 A1* | 9/2016 | Ström | H04N 19/154 | 375/240.08 |
| 2017/0150029 A1* | 5/2017 | Robertson | H04N 23/73 | |
| 2017/0330499 A1* | 11/2017 | Nakagoshi | G09G 3/36 | |
| 2017/0347008 A1* | 11/2017 | Griffin | H04N 23/741 | |
| 2017/0352137 A1* | 12/2017 | Van Der Vleuten | G06T 7/90 | |
| 2018/0048801 A1* | 2/2018 | Kiser | G06V 20/582 | |
| 2018/0075588 A1* | 3/2018 | Hosoda | H04N 25/134 | |
| 2018/0167544 A1* | 6/2018 | Jeong | H04N 25/589 | |
| 2018/0233061 A1* | 8/2018 | Rozenberg | G09B 9/12 | |
| 2018/0246521 A1* | 8/2018 | Seo | G06T 5/92 | |
| 2018/0367744 A1* | 12/2018 | Ozone | H04N 25/131 | |
| 2019/0045137 A1* | 2/2019 | Kamiya | H04N 5/265 | |
| 2019/0075229 A1* | 3/2019 | Kamiya | H04N 23/71 | |
| 2019/0096046 A1* | 3/2019 | Kalantari | G06N 3/0464 | |
| 2019/0098724 A1* | 3/2019 | Zhao | H05B 47/125 | |
| 2019/0164261 A1* | 5/2019 | Sunkavalli | G06T 1/20 | |
| 2019/0170502 A1* | 6/2019 | Tamaru | G02B 7/30 | |
| 2019/0213439 A1* | 7/2019 | Liu | G06N 3/08 | |
| 2019/0220029 A1* | 7/2019 | Fukuhara | G06N 3/09 | |
| 2019/0239731 A1* | 8/2019 | Hanzawa | G02B 21/361 | |
| 2019/0289344 A1* | 9/2019 | Ichikawa | H04N 21/2662 | |
| 2019/0295454 A1* | 9/2019 | Urabe | G09G 3/22 | |
| 2019/0335146 A1* | 10/2019 | Hisano | G06T 5/92 | |
| 2019/0370586 A1* | 12/2019 | Otsuki | G06V 10/143 | |
| 2019/0379817 A1* | 12/2019 | Darson | H10F 39/803 | |
| 2020/0014904 A1* | 1/2020 | Wetzstein | G06T 7/0002 | |

(56) References Cited

U.S. PATENT DOCUMENTS

| | | | |
|---|---|---|---|
| 2020/0077012 A1* | 3/2020 | Miyai | H04N 23/56 |
| 2020/0151509 A1* | 5/2020 | Sunkavalli | G06V 10/82 |
| 2020/0175660 A1* | 6/2020 | Iijima | G06T 5/92 |
| 2020/0221007 A1* | 7/2020 | Kenjo | H04N 23/741 |
| 2020/0257306 A1* | 8/2020 | Nisenzon | G06V 20/56 |
| 2020/0288047 A1* | 9/2020 | Sugiyama | H04N 23/45 |
| 2020/0304698 A1* | 9/2020 | Yasuma | H04N 7/18 |
| 2020/0311901 A1* | 10/2020 | Sun | G06V 10/764 |
| 2020/0329187 A1* | 10/2020 | Huang | H04N 23/73 |
| 2021/0073955 A1* | 3/2021 | Zhang | G06T 5/92 |
| 2021/0110554 A1* | 4/2021 | Rivard | G06N 3/088 |
| 2021/0125324 A1* | 4/2021 | Novikov | H04N 25/611 |
| 2021/0150812 A1* | 5/2021 | Su | G06N 3/0499 |
| 2021/0185209 A1* | 6/2021 | Dolan | H04N 25/57 |
| 2021/0227119 A1* | 7/2021 | Dobrinsky | H04N 25/20 |
| 2021/0227156 A1* | 7/2021 | Melamud | H04N 25/63 |
| 2021/0281745 A1* | 9/2021 | Hibi | G06V 40/164 |
| 2021/0289157 A1* | 9/2021 | Ha | H04N 25/59 |
| 2021/0289242 A1* | 9/2021 | Ichikawa | H04N 21/44245 |
| 2021/0350129 A1* | 11/2021 | Muhrbeck | G06V 10/764 |
| 2021/0366088 A1* | 11/2021 | Chae | G06T 5/90 |
| 2021/0398257 A1* | 12/2021 | Wang | G06V 10/14 |
| 2022/0006939 A1* | 1/2022 | Lee | G01B 11/026 |
| 2022/0058783 A1* | 2/2022 | Kadu | H04N 19/172 |
| 2022/0083797 A1* | 3/2022 | Kim | G06F 18/24 |
| 2022/0182555 A1* | 6/2022 | Kawakami | A61B 1/00039 |
| 2022/0189029 A1* | 6/2022 | Mequanint | G06T 7/194 |
| 2022/0189178 A1* | 6/2022 | Bowers | G06T 7/90 |
| 2022/0232182 A1* | 7/2022 | Watanabe | H04N 25/581 |
| 2022/0269910 A1* | 8/2022 | Onzon | G06V 10/778 |
| 2022/0284567 A1* | 9/2022 | Ohya | G06N 3/0464 |
| 2022/0351341 A1* | 11/2022 | Rassool | H04N 21/84 |
| 2022/0351343 A1* | 11/2022 | Rassool | G06T 5/40 |
| 2022/0358627 A1* | 11/2022 | Deng | G06N 3/09 |
| 2022/0368353 A1* | 11/2022 | Sugioka | H03M 13/611 |
| 2022/0383516 A1* | 12/2022 | Ustiuzhanin | G06T 3/18 |
| 2022/0385848 A1* | 12/2022 | Venkataraman | G06T 11/60 |
| 2022/0414847 A1* | 12/2022 | Kwon | G06T 5/50 |
| 2022/0417414 A1* | 12/2022 | Zhang | H04N 23/676 |
| 2023/0114798 A1* | 4/2023 | Nossek | G06T 5/70 |
| | | | 382/100 |
| 2023/0171509 A1* | 6/2023 | Varghese | G06T 5/50 |
| | | | 348/222.1 |
| 2023/0224599 A1* | 7/2023 | Gutierrez Barragan | |
| | | | H10F 39/809 |
| | | | 348/208.1 |
| 2023/0234503 A1* | 7/2023 | Eki | H04N 23/84 |
| | | | 348/373 |
| 2023/0308210 A1* | 9/2023 | Sugioka | H03M 5/145 |
| 2023/0336875 A1* | 10/2023 | Pieper | H04N 23/11 |
| 2023/0342894 A1* | 10/2023 | Scharfenberger | H04N 5/2624 |
| 2023/0370727 A1* | 11/2023 | Han | H04N 23/73 |
| 2023/0385379 A1* | 11/2023 | Wrenninge | G06V 20/56 |
| 2024/0031694 A1* | 1/2024 | Lim | H04N 25/59 |
| 2024/0064431 A1* | 2/2024 | Ozone | H04N 25/533 |
| 2024/0107134 A1* | 3/2024 | Choi | H04N 23/741 |
| 2024/0127402 A1* | 4/2024 | Dastjerdi | G06T 5/50 |
| 2024/0161255 A1* | 5/2024 | Klein | G06T 5/50 |
| 2024/0331362 A1* | 10/2024 | Ouyang | G06V 10/774 |
| 2025/0045867 A1* | 2/2025 | Gnanasambandam | |
| | | | G06T 3/4038 |
| 2025/0045887 A1* | 2/2025 | Garon | G06T 5/60 |
| 2025/0053287 A1* | 2/2025 | Rivard | G06F 16/51 |
| 2025/0054264 A1* | 2/2025 | Aoki | H04N 23/741 |
| 2025/0054292 A1* | 2/2025 | Aoki | G06T 7/00 |
| 2025/0081670 A1* | 3/2025 | Ota | H10F 77/959 |
| 2025/0139745 A1* | 5/2025 | Liang | G06T 5/94 |
| 2025/0218053 A1* | 7/2025 | Galvin | H04N 19/42 |
| 2025/0240381 A1* | 7/2025 | Ni | G06V 10/60 |

FOREIGN PATENT DOCUMENTS

| | | |
|---|---|---|
| CN | 110692236 A | 1/2020 |
| JP | 2013-117958 A | 6/2013 |
| JP | 2014-049127 A | 3/2014 |
| JP | 2018-060511 A | 4/2018 |
| JP | 2018-061086 A | 4/2018 |
| JP | 2018-170007 A | 11/2018 |
| JP | 2019-022173 A | 2/2019 |

* cited by examiner

Figure 7:
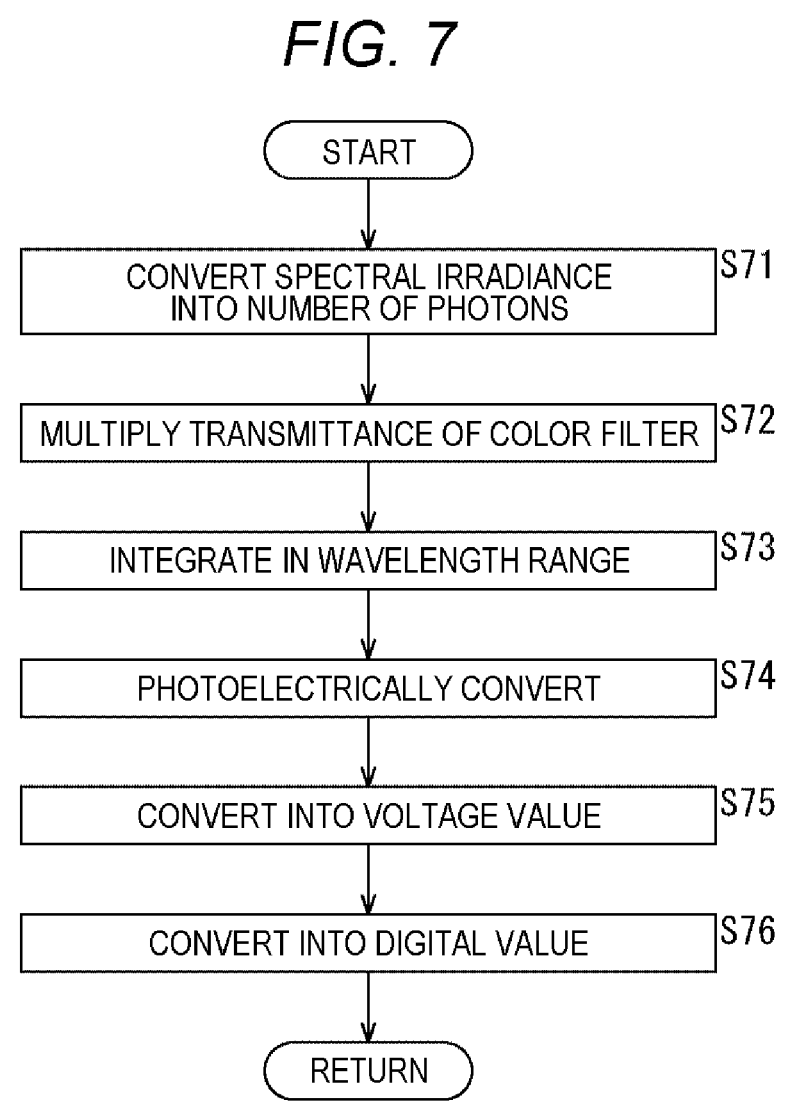

```
              ( START )
                  │
                  ▼
   ┌─────────────────────────────────┐
   │  CONVERT SPECTRAL IRRADIANCE     │ S71
   │  INTO NUMBER OF PHOTONS          │
   └─────────────────────────────────┘
                  │
                  ▼
   ┌─────────────────────────────────┐
   │ MULTIPLY TRANSMITTANCE OF COLOR  │ S72
   │           FILTER                 │
   └─────────────────────────────────┘
                  │
                  ▼
   ┌─────────────────────────────────┐
   │  INTEGRATE IN WAVELENGTH RANGE   │ S73
   └─────────────────────────────────┘
                  │
                  ▼
   ┌─────────────────────────────────┐
   │   PHOTOELECTRICALLY CONVERT      │ S74
   └─────────────────────────────────┘
                  │
                  ▼
   ┌─────────────────────────────────┐
   │   CONVERT INTO VOLTAGE VALUE     │ S75
   └─────────────────────────────────┘
                  │
                  ▼
   ┌─────────────────────────────────┐
   │   CONVERT INTO DIGITAL VALUE     │ S76
   └─────────────────────────────────┘
                  │
                  ▼
             ( RETURN )
```

*FIG. 8*

IMAGE GENERATION APPARATUS AND IMAGE GENERATION METHOD

CROSS REFERENCE TO RELATED APPLICATIONS

This application is a U.S. National Phase of International Patent Application No. PCT/JP2021/045488 filed on Dec. 10, 2021, which claims priority benefit of Japanese Patent Application No. JP 2020-213546 filed in the Japan Patent Office on Dec. 23, 2020. Each of the above-referenced applications is hereby incorporated herein by reference in its entirety.

TECHNICAL FIELD

The present disclosure relates to an image generation apparatus, an image generation method, and a program, and more particularly, to an image generation apparatus, an image generation method, and a program that enable correct evaluation of recognition performance of an image recognition algorithm.

BACKGROUND ART

In development of an automated driving system, an image recognition algorithm is verified by simulation on a virtual space. In such verification of an image recognition algorithm, an input image considerably similar to a live-action image is generated by computer graphics (CG) synthesis technology using a sensor model of an image sensor.

Patent Document 1 discloses a simulation system of a three-dimensional camera configured to reproduce noise and saturation for a sensor model in a simulation environment of an aircraft.

CITATION LIST

Patent Document

Patent Document 1: JP 2013-117958 A

SUMMARY OF THE INVENTION

Problems to be Solved by the Invention

In recent years, a high dynamic range (HDR) image sensor has been used in an automated driving system and an advanced driver assistance system (ADAS) for automobiles. However, in a simulation environment for automobiles, reproduction of noise or the like in a case where an HDR image sensor is used is not considered, and there is a possibility that the recognition performance of an image recognition algorithm cannot be correctly evaluated.

The present disclosure has been made in view of such a situation, and aims to correctly evaluate the recognition performance of an image recognition algorithm.

Solutions to Problems

An image generation apparatus of the present disclosure is an image generation apparatus including: an image generation unit that generates a plurality of simulation images in which a plurality of images having different accumulation times is reproduced on the basis of a physical quantity corresponding to light applied to an image sensor; and an HDR synthesis unit that performs HDR synthesis on a plurality of the simulation images.

An image generation method of the present disclosure is an image generation method in which an image generation apparatus executes processing of: generating a plurality of simulation images in which a plurality of images having different accumulation times is reproduced on the basis of a physical quantity corresponding to light applied to the image sensor; and performing HDR synthesis on a plurality of the simulation images.

A program of the present disclosure is a program that causes a computer to perform processing of: generating a plurality of simulation images in which a plurality of images having different accumulation times is reproduced on the basis of a physical quantity corresponding to light applied to the image sensor; and performing HDR synthesis on a plurality of the simulation images.

In the present disclosure, a plurality of simulation images in which a plurality of images having different accumulation times is reproduced on the basis of a physical quantity corresponding to light applied to the image sensor is generated, and HDR synthesis on a plurality of the simulation images is performed.

BRIEF DESCRIPTION OF DRAWINGS

FIG. 2 is a diagram illustrating a configuration example of a simulation system according to a mode of the present disclosure.

FIG. 6 is a block diagram illustrating a configuration example of an image sensor model according to a second mode.

FIG. 7 is a flowchart for explaining simulation image generation processing.

FIG. 8 is a block diagram illustrating a configuration example of a computer.

MODE FOR CARRYING OUT THE INVENTION

Figure 1:
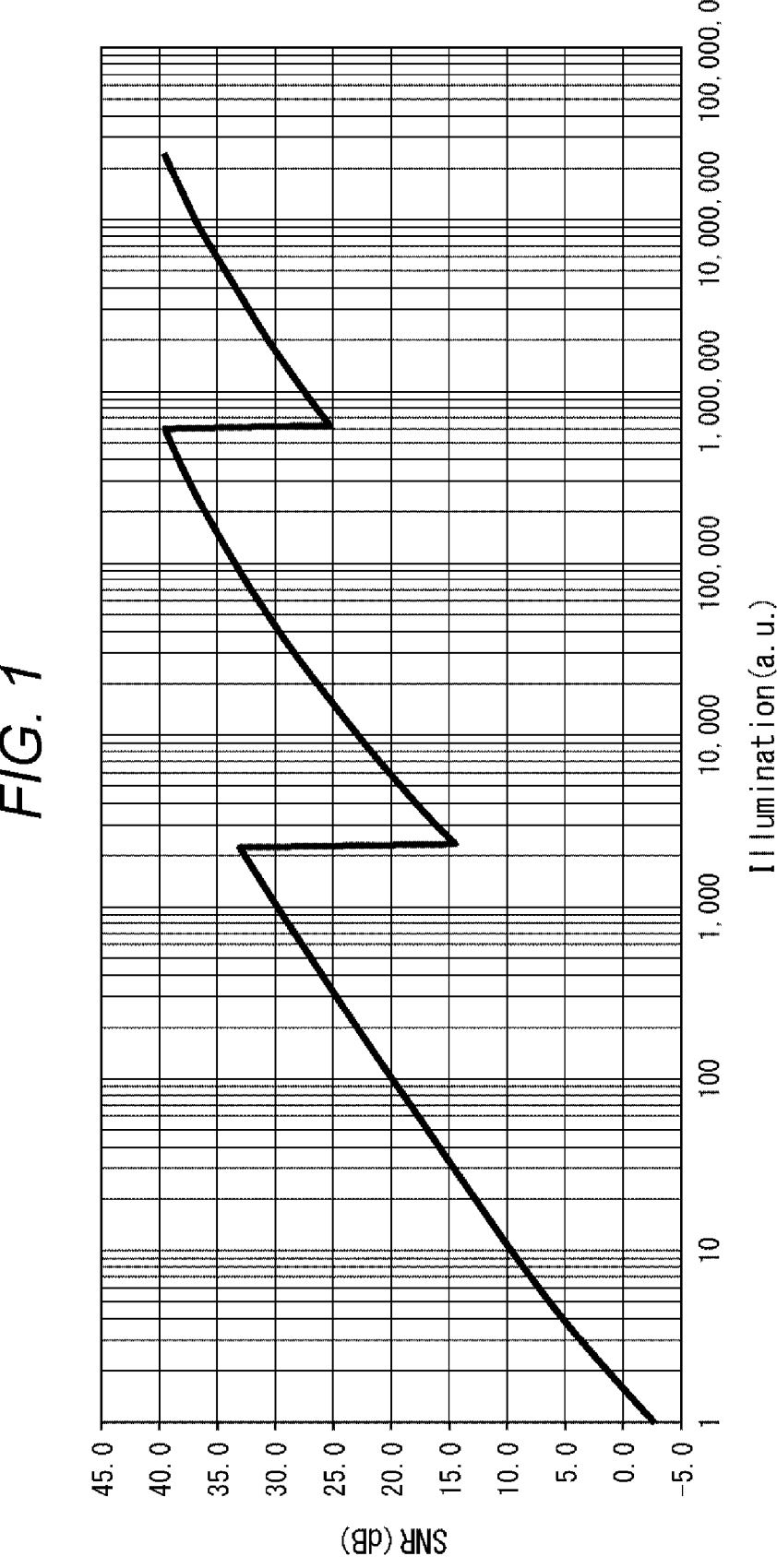
FIG. 1 is a diagram illustrating an example of an SNR Drop.

Hereinafter, modes for carrying out the present disclosure (hereinafter referred to as modes) will be described. Note that the description will be given in the following order.

1. Problems of the prior art
2. Configuration example of simulation system
3. Image sensor model (multiple exposure system) according to first mode
4. Image sensor model (DOL system) according to second mode
5. Configuration example of computer

1. Problems of the Prior Art

In development of an automated driving system, an image recognition algorithm is verified by simulation on a virtual space. In such verification of an image recognition algorithm, an input image considerably similar to a live-action image is generated by CG synthesis technology using a sensor model of an image sensor.

In recent years, HDR image sensors have been used in automated driving systems and ADAS for automobiles. In an HDR image sensor that synthesizes a plurality of images captured at different accumulation times, it is known that, when the accumulation time changes, a decrease in SNR occurs, which is called SNR drop. The SNR drop deteriorates recognition performance of an image recognition algorithm. SNR (Signal-to-Noise Ratio) is a ratio of noise to signal.

FIG. 1 illustrates an example of an SNR drop in a case where capture is performed with three different accumulation times. FIG. 1 illustrates an SNR with respect to illuminance (dynamic range), and the SNR greatly decreases at boundaries of HDR synthesis.

However, in order to evaluate the recognition performance of the image recognition algorithm in a simulation environment for automobiles, it is necessary to reproduce the SNR drop as illustrated in FIG. 1.

Therefore, in the technology according to the present disclosure, it is achieved to reproduce the SNR drop in a simulation environment for automobiles.

2. Configuration Example of Simulation System

Figure 2:
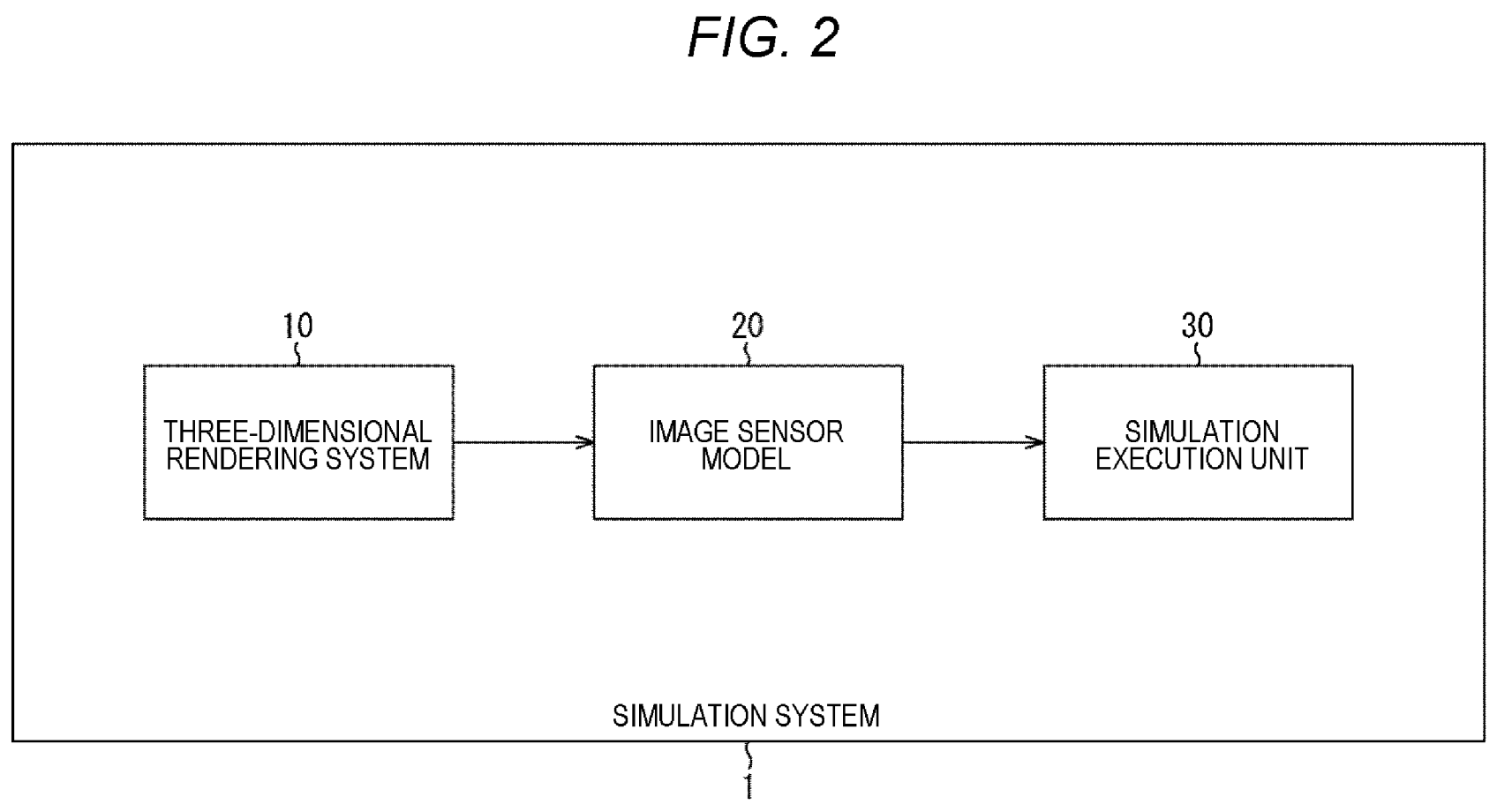

FIG. 2 is a diagram illustrating a configuration example of a simulation system according to a mode of the present disclosure.

A simulation system 1 in FIG. 2 is configured by hardware, software, or a combination thereof. The simulation system 1 is configured to simulate an operation of a camera system in an automated driving system for automobiles or in ADAS.

The simulation system 1 includes a three-dimensional rendering system 10, an image sensor model 20, and a simulation execution unit 30.

The three-dimensional rendering system 10 generates image data of an input image for simulating the operation of the camera system in the automated driving system or in the ADAS, and supplies the image data to the image sensor model 20. The input image includes, for example, a road, a vehicle traveling on the road, and the like.

The image sensor model 20 generates a CG image in which a three-dimensional image obtained by the camera system is simulated, on the basis of the image data from the three-dimensional rendering system 10, and supplies the CG image to the simulation execution unit 30.

Using the CG image from the image sensor model 20, the simulation execution unit 30 simulates the operation of the camera system by an image recognition algorithm prepared in advance. The recognition performance of the image recognition algorithm is evaluated based on a result of the simulation made by the simulation execution unit 30.

The following describes a mode of the image sensor model 20 constituting the simulation system 1.

3. Image Sensor Model According to First Mode (Configuration Example of Image Sensor Model)

Figure 3:
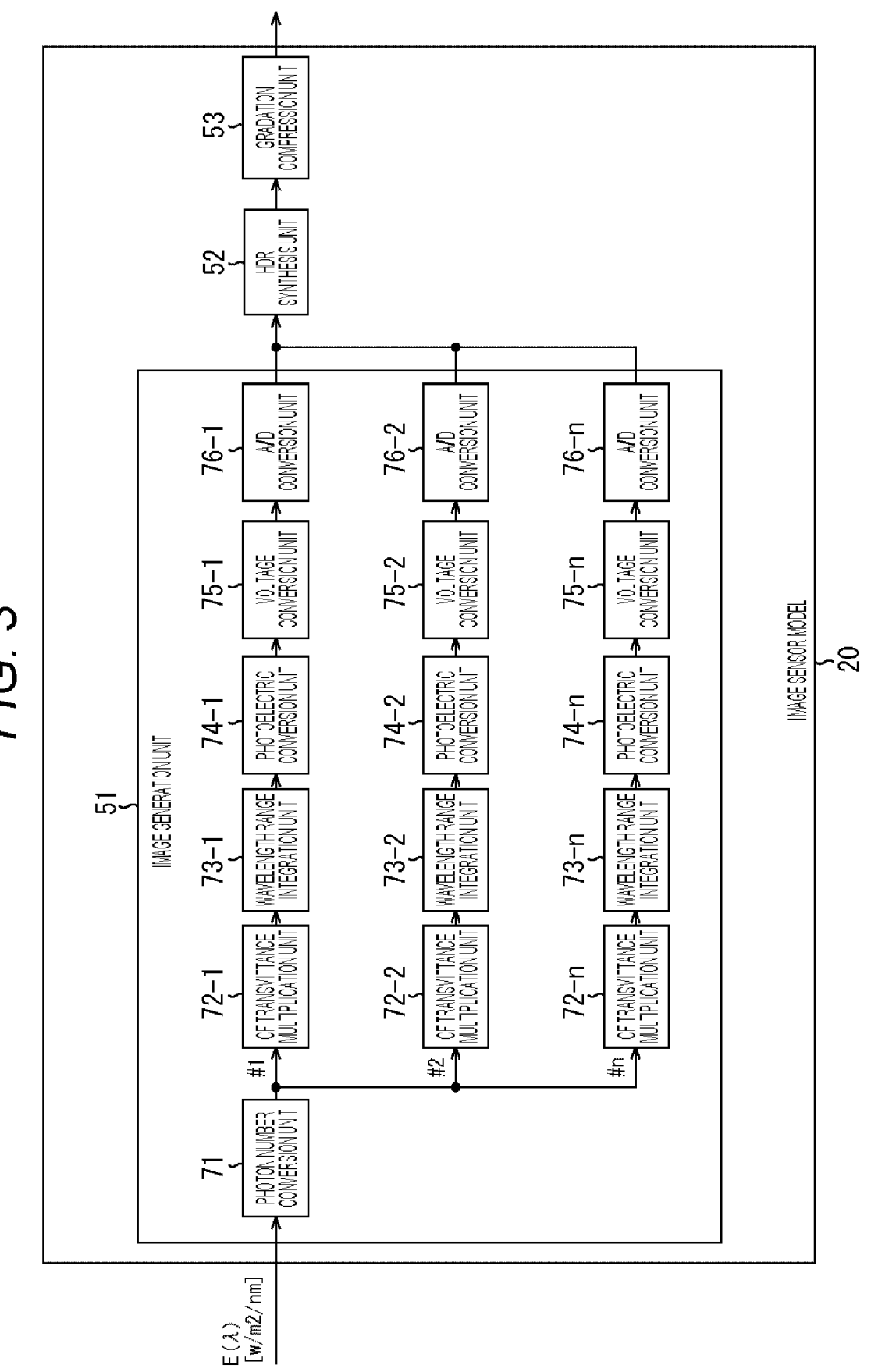
FIG. 3 is a block diagram illustrating a configuration example of an image sensor model according to a first mode.

FIG. 3 is a block diagram illustrating a configuration example of an image sensor model 20 according to a first mode.

The image sensor model 20 in FIG. 3 includes an image generation unit 51, an HDR synthesis unit 52, and a gradation compression unit 53.

The image generation unit 51 generates a plurality of simulation images in which a plurality of images having different accumulation times is reproduced, on the basis of a physical quantity (energy amount) corresponding to light applied to the image sensor (HDR image sensor). The image generation unit 51 generates the plurality of simulation images on the basis of a physical quantity corresponding to one predetermined frame.

That is, the simulation images generated by the image generation unit 51 can be said to be image data assuming HDR synthesis of the multiple exposure system that simultaneously captures the same subject under different exposure conditions. The plurality of generated simulation images is supplied to the HDR synthesis unit 52.

The HDR synthesis unit 52 performs HDR synthesis on the plurality of simulation images supplied from the image generation unit 51. The HDR image obtained by the HDR synthesis is supplied to the gradation compression unit 53.

The gradation compression unit 53, depending on a transmission band of the HDR image from the HDR synthesis unit 52 (a band of a transmission path between the image sensor model 20 and the simulation execution unit 30), performs gradation compression on the HDR image. Specifically, the gradation compression unit 53 changes a compression ratio for each luminance value of a pixel of the HDR image. For example, since lower bits of high-luminance pixel data do not include important information, the lower bits are compressed. The image data of the HDR image subjected to the gradation compression is supplied to the simulation execution unit 30.

Note that, although not illustrated, it is assumed that a signal processing unit that performs signal processing such as pixel defect correction and noise reduction processing is included between the image generation unit 51 and the gradation compression unit 53.

The image generation unit 51 includes a photon number conversion unit 71, CF transmittance multiplication units 72-1 to 72-$n$, wavelength range integration units 73-1 to 73-$n$, photoelectric conversion units 74-1 to 74-$n$, voltage conversion units 75-1 to 75-$n$, and A/D conversion units 76-1 to 76-$n$.

For the physical quantity corresponding to one predetermined frame input to the image generation unit 51, the photon number conversion unit 71 converts the physical quantity corresponding to a predetermined position of the image sensor into the number of photons and supplies the photon number to each of the CF transmittance multiplication units 72-1 to 72-$n$.

Functional blocks from and after the CF transmittance multiplication units 72-1 to 72-$n$ (72-1, 72-2, . . . , 72-$n$) are provided for each accumulation time (hereinafter also referred to as accumulation #1, #2, . . . , #$n$, or the like). In a case where general HDR synthesis is assumed, n is, for example, 3 or 4. Hereinafter, in a case where the functional blocks for each accumulation time are not distinguished from each other, "-1", "-2", and "-$n$" at the end of reference numerals will be omitted.

A CF transmittance multiplication unit 72 multiplies the number of photons from the photon number conversion unit 71 by transmittance of a color filter (CF) corresponding to each of pixels of the image sensor for each accumulation time. The number of photons multiplied by the transmittance of the CF is supplied to a wavelength range integration unit 73.

The wavelength range integration unit 73 integrates the number of photons from a CF transmittance multiplication unit 72 for a predetermined wavelength range for each accumulation time. The number of photons integrated for the wavelength range is supplied to a photoelectric conversion unit 74.

The photoelectric conversion unit 74 converts the number of photons from the wavelength range integration unit 73 into a charge amount (photoelectric conversion) for each accumulation time. With the photoelectric conversion unit 74, the charge amount for each pixel is calculated for each accumulation time. The calculated charge amount for each pixel is supplied to a voltage conversion unit 75.

The voltage conversion unit 75 converts the charge amount for each pixel from the photoelectric conversion unit 74 into an analog voltage value for each accumulation time, and supplies the analog voltage value to an A/D conversion unit 76.

The A/D conversion unit 76 converts the voltage value for each pixel from the voltage conversion unit 75 into a digital value (A/D conversion) for each accumulation time, thereby generating a simulation image for each accumulation time. Each of the simulation images is supplied to the HDR synthesis unit 52.

Note that, in the example of FIG. 3, the functional blocks in the image generation unit 51 include the CF transmittance multiplication unit 72, the wavelength range integration unit 73, the photoelectric conversion unit 74, the voltage conversion unit 75, and the A/D conversion unit 76 in this order, but the order of some of these units may be reversed.

(Operation of Image Sensor Model)

Figure 4:
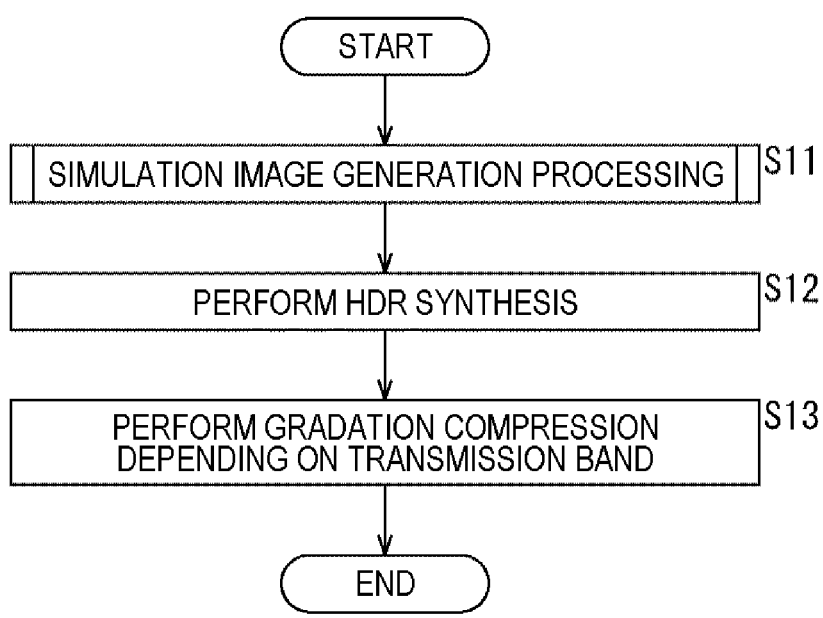
FIG. 4 is a flowchart for explaining an operation of the image sensor model.

With reference to the flowchart in FIG. 4, an operation of the image sensor model 20 in FIG. 3 is explained. The processing of FIG. 4 is executed every time a physical quantity corresponding to each frame of the input image is input to the image sensor model 20 at a frame rate such as 30 fps, for example.

In the present mode, the spectral irradiance E ($\lambda$) [W/m2/nm] is input as the physical quantity. The spectral irradiance E ($\lambda$) represents illuminance for each wavelength per unit area.

In step S11, the image generation unit 51 executes simulation image generation processing of generating a plurality of simulation images in which a plurality of images having different accumulation times is reproduced.

Figure 5:
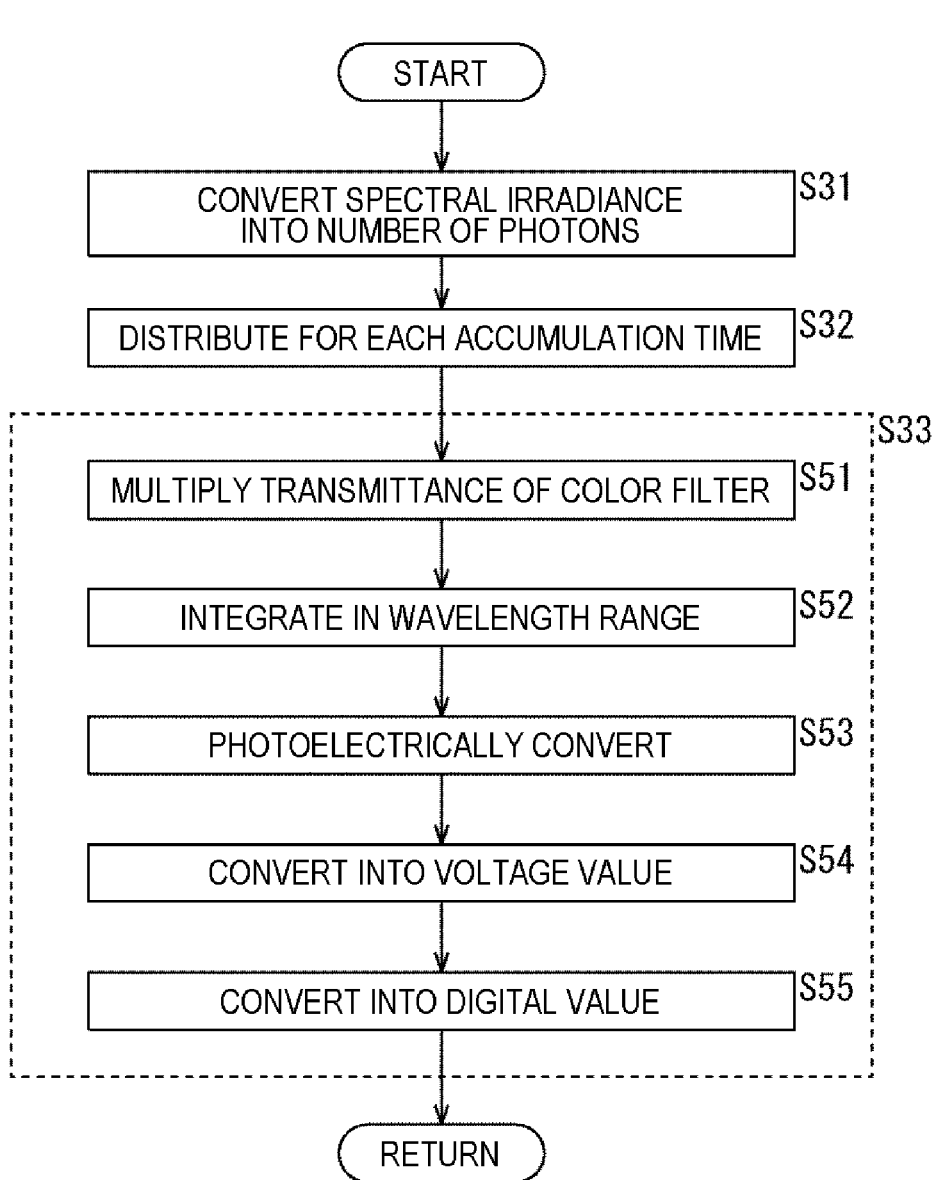
FIG. 5 is a flowchart for explaining simulation image generation processing.

FIG. 5 is a flowchart for explaining simulation image generation processing in step S11.

In step S31, the photon number conversion unit 71 divides the input spectral irradiance E ($\lambda$) by the photon energy h$\upsilon$=hc/$\lambda$, thereby converting the spectral irradiance E ($\lambda$) into the photon number. Here, h represents a Planck constant, and c represents the speed of light. Assuming that it is represented by E ($\Delta$)$_p$=h$\upsilon$, the photon number for each wavelength per unit area per unit time is expressed by the following expression.

$$E(\lambda)/E(\lambda)_P \;[/m2/sec/nm]$$ [Math. 1]

In step S32, the photon number conversion unit 71 distributes the converted photon number for each accumulation time. Specifically, the photon number conversion unit 71 supplies the converted photon number to each of the CF transmittance multiplication units 72-1, 72-2, . . . , and 72-n.

In step S33, the processing of steps S51 to S55 is executed in parallel for each accumulation time (accumulation #1, #2, . . . , #n).

In step S51, the CF transmittance multiplication unit 72 multiplies the number of photons converted by the photon number conversion unit 71 by the transmittance of the CF. Assuming that the transmittance of CF is represented by S$_i$ ($\lambda$), the number of photons multiplied by the transmittance of CF is expressed by the following expression.

$$E(\lambda)/E(\lambda)_p \cdot S_i(\lambda) \;[/m2/sec/nm]$$ [Math. 2]

Note that i represents each color of the subpixel of the CF.

In step S52, the wavelength range integration unit 73 integrates the number of photons multiplied by the transmittance of the CF in the wavelength range from $\lambda_1$ to $\lambda_2$. The wavelength range from $\lambda_1$ to $\lambda_2$ is, for example, the entire wavelength range of visible light. The number of photons integrated in the wavelength range from $\lambda_1$ to $\lambda_2$ is expressed by the following expression.

$$\int_{\lambda_1}^{\lambda_2} g(\lambda)/g(\lambda)_p \cdot S_i(\lambda)d\lambda \left[ /m2/\mathrm{sec} \right]$$ [Math. 3]

In step S53, the photoelectric conversion unit 74 photoelectrically converts the number of photons integrated in the wavelength range from $\lambda_1$ to $\lambda_2$ into the charge amount. Specifically, the photoelectric conversion unit 74 multiplies the number of photons integrated in the wavelength range from $\lambda_1$ to $\lambda_2$ by the pixel area A$_i$ [m2] (subpixel area), the accumulation time t$_i$[sec], and further the quantum efficiency q$_i$ [e−]. Here, the accumulation time t$_i$ is assumed to have a different length for each of the accumulations #1, #2, . . . , and #n. With this arrangement, a charge amount N$_i$ for each pixel (subpixel) expressed by the following formula is calculated for each accumulation time.

$$N_i = q_i \cdot A_i \cdot t_i \cdot \int_{\lambda}^{\lambda} E(\lambda)/E(\lambda)_p \cdot S_i(\lambda)d\lambda[e-]$$ [Math. 4]

However, in a case where the charge amount N$_i$ exceeds the pixel saturation amount FWC$_i$[e−], the charge amount N$_i$ is clipped to FWC$_i$.

In addition, if it is necessary, the photoelectric conversion unit 74 adds a predetermined noise component to the charge amount N$_i$ calculated for each pixel (subpixel). Examples of the noise component added include light shot noise, photo response non-uniformity (PRNU), dark signal non-uniformity (DSNU), and a dark white spot. With this arrangement, pixel heterogeneity is reproduced.

In step S54, the voltage conversion unit 75 converts the charge amount calculated for each pixel (subpixel) into an analog voltage value. Specifically, the voltage conversion unit 75 multiplies the charge amount N$_i$ of each pixel by conversion efficiency ce$_i$ [mV/e−]. With this arrangement, a voltage value V$_i$ for each pixel (subpixel) expressed by the following formula is calculated for each accumulation time.

$$V_i = ce_i N_i \;[mV]$$ [Math. 5]

However, in a case where the voltage value V$_i$ exceeds saturation voltage u$_i$ [mV], the voltage value V$_i$ is clipped to u$_i$.

In addition, if it is necessary, the voltage conversion unit 75 adds a predetermined noise component to the voltage value V$_i$ calculated for each pixel (subpixel). Examples of the noise component added includes random noise such as floating diffusion (FD) amplifier noise. With this arrangement, pixel heterogeneity is reproduced.

In step S55, the A/D conversion unit 76 converts the voltage value calculated for each pixel (subpixel) into a digital value. Specifically, the A/D conversion unit 76 multiplies the voltage value V$_i$ of each pixel by a conversion coefficient dc$_i$ [digit/mV]. With the conversion coefficient dc$_i$, the voltage value is converted into a digital value according to the bit accuracy (resolution) of the A/D conversion unit 76. For example, in a case where the bit accuracy is 12 bits, the voltage value is converted to take a value in a range of 0 to 4095 by the conversion coefficient $dc_i$. The converted digital value includes quantization noise. With this arrangement, a digital value $DN_i$ for each pixel (subpixel) expressed by the following formula is calculated for each accumulation time.

$$DN_i = dc_i V_i \text{ [digit]} \qquad \text{[Math. 6]}$$

In this way, each of digital values of respective pixels calculated for each accumulation time is supplied to the HDR synthesis unit 52 as simulation images in which images having different accumulation times are reproduced, and the process returns to step S11 in FIG. 4.

In step S12 in FIG. 4, the HDR synthesis unit 52 performs HDR synthesis on each simulation image on the basis of the digital value of each pixel calculated for each accumulation time. Specifically, for each pixel, the HDR synthesis unit 52 performs threshold processing on the digital value $DN_i$ for each accumulation time, thereby obtaining a pixel signal of each pixel of the HDR image.

For example, among R pixels, G pixels, and B pixels in a Bayer array, in a case where HDR synthesis of the R pixels is performed, threshold value processing represented by the following formula is performed on digital values $DN_{R1}$, $DN_{R2}$, . . . and $DN_{Rn}$ of the respective accumulations #1, #2, . . . , and #n, so that a pixel signal $HDR_R$ of the R pixel in the HDR image is obtained.

$$HDR_R = \text{if } DN_{R1} < th_{R1} \text{ then } g_{R1} \cdot DN_{R1} \qquad \text{[Math. 7]}$$

else if $DN_{R2} < th_{R2}$ then $g_{R2} \cdot DN_{R2}$ . . . (similar until #n is reached)

With the formula described above, the digital value $DN_{R1}$ having the highest sensitivity (the shortest accumulation time) is compared with a threshold value $th_{R1}$, and in a case where the digital value $DN_{R1}$ is smaller than the threshold value $th_{R1}$, a value $g_{R1} \cdot DN_{R1}$ obtained by multiplying the digital value $DN_{R1}$ by the gain $g_{R1}$ is determined as the pixel signal $HDR_R$. In a case where the digital value $DN_{R1}$ is larger than the threshold value $th_{R1}$, the digital value $DN_{R2}$ having the second highest sensitivity (the second shortest accumulation time) is compared with a threshold value $th_{R2}$. In a case where the digital value $DN_{R2}$ is smaller than the threshold value $th_{R2}$, a value $g_{R2} \cdot DN_{R2}$ obtained by multiplying the digital value $DN_{R2}$ by the gain $g_{R2}$ is determined as the pixel signal $HDR_R$. Such a comparison is similarly performed until the digital value $DN_{Rn}$ having the lowest sensitivity (the longest accumulation time) is reached.

In step S13, the gradation compression unit 53, depending on the transmission band, hierarchically compresses the pixel signal of the HDR image obtained by the HDR synthesis. For example, in a case where the pixel signal of the HDR image obtained by the HDR synthesis is of 24 bits, the gradation compression unit 53 performs down-sampling to 12 bits by a method such as polygonal line compression or adaptive gradation conversion. Note that the hierarchical compression of the pixel signals is only required to be executed as necessary.

Furthermore, digital signal processing such as defect correction and noise reduction of the pixel may be performed between steps S11 and S12 or between steps S12 and S13.

With the above processing, since a plurality of simulation images in which a plurality of images having different accumulation times is reproduced is generated and the HDR synthesis is performed, the SNR drop can be reproduced similarly to an actual HDR image sensor. With this arrangement, the recognition performance of the image recognition algorithm in the simulation made by the simulation execution unit 30 can be correctly evaluated.

4. Image Sensor Model According to Second Mode (Configuration Example of Image Sensor Model)

Figure 6:
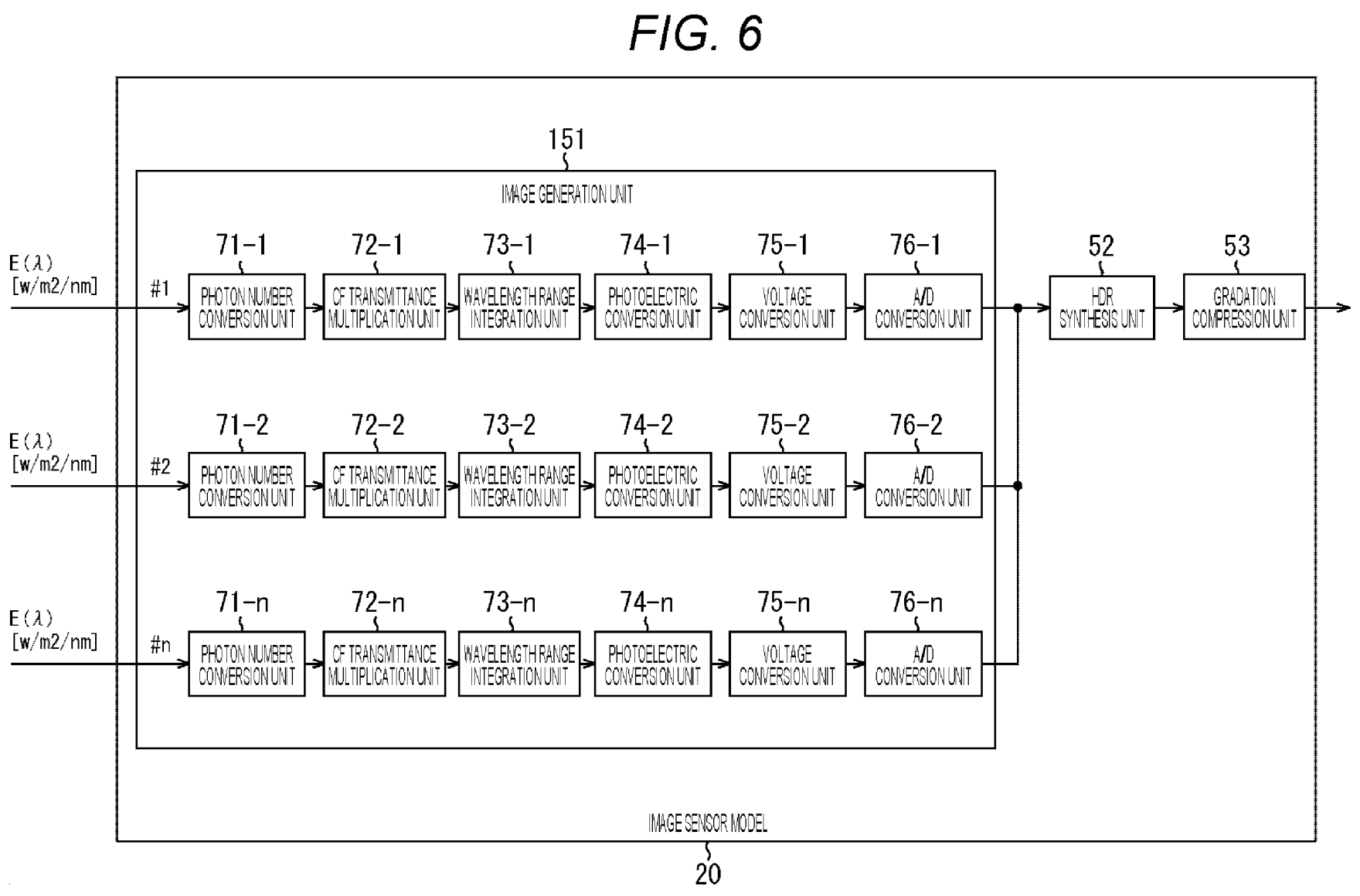

FIG. 6 is a block diagram illustrating a configuration example of an image sensor model 20 according to a second mode.

The image sensor model 20 in FIG. 6 includes an image generation unit 151, an HDR synthesis unit 52, and a gradation compression unit 53. Since the configuration of the HDR synthesis unit 52 and the gradation compression unit 53 is similar to that the image sensor model 20 in FIG. 3 has, the description of the configuration will be omitted.

The image generation unit 151 is similar to the image generation unit 51 in FIG. 3 in that the image generation unit 151 generates a plurality of simulation images in which a plurality of images having different accumulation times is reproduced on the basis of a physical quantity corresponding to light applied to the image sensor. However, the image generation unit 151 is different from the image generation unit 51 in FIG. 3 in that the image generation unit 151 generates a plurality of simulation images on the basis of the physical quantity corresponding to each of frames at different timings.

That is, the simulation images generated by the image generation unit 151 can be said to be image data assuming HDR synthesis of what is called a digital overlap (DOL) system that captures the same subject under different exposure conditions at different timings.

The image generation unit 151 includes the photon number conversion units 71-1 to 71-$n$, the CF transmittance multiplication units 72-1 to 72-$n$, the wavelength range integration units 73-1 to 73-$n$, the photoelectric conversion units 74-1 to 74-$n$, the voltage conversion units 75-1 to 75-$n$, and the A/D conversion units 76-1 to 76-$n$.

The image generation unit 151 is different from the image generation unit 51 in FIG. 3 in that the photon number conversion unit 71 is provided for each accumulation time (accumulation #1, #2, #n). That is, for the physical quantity corresponding to each of the frames at different timings, the photon number conversion unit 71 converts a physical quantity corresponding to a predetermined position of the image sensor into the number of photons and supplies the number of photons to the CF transmittance multiplication unit 72, for each accumulation time.

Since the configurations of the functional blocks from and after the CF transmittance multiplication units 72-1 to 72-$n$ (72-1, 72-2, . . . , 72-$n$) are similar to that the image generation unit 51 in FIG. 3 has, the description of the functional blocks will be omitted.

(Operation of Image Sensor Model)

The operation of the image sensor model 20 in FIG. 6 is basically similar to the operation of the image sensor model 20 in FIG. 3 described with reference to the flowchart in FIG. 4. However, the image sensor model 20 in FIG. 6 executes the simulation image generation processing illustrated in the flowchart in FIG. 7 as the simulation image generation processing in step S11 in FIG. 4.

The simulation image generation processing of FIG. 7 is executed in parallel for each accumulation time.

That is, in step S71, the photon number conversion unit 71 converts the spectral irradiance E (A) input corresponding to frames at different timings into the number of photons for each accumulation time. The processing of step S72 and subsequent steps is executed in a similar manner to the processing of step S33 (steps S51 to S55) of the flowchart in FIG. 5.

With the above processing, the SNR drop can be reproduced also in the HDR image sensor assuming the HDR synthesis of the DOL system, similarly to an actual HDR image sensor. With this arrangement, the recognition performance of the image recognition algorithm in the simulation made by the simulation execution unit 30 can be correctly evaluated.

5. Configuration Example of Computer

A series of processing described above can be executed by software. In this case, the program constituting the software is installed in a computer. Here, examples of the computer include a computer incorporated in dedicated hardware and, for example, a general-purpose personal computer capable of executing various functions when various programs are installed. Note that a series of processing may be executed by hardware.

Figure 8:
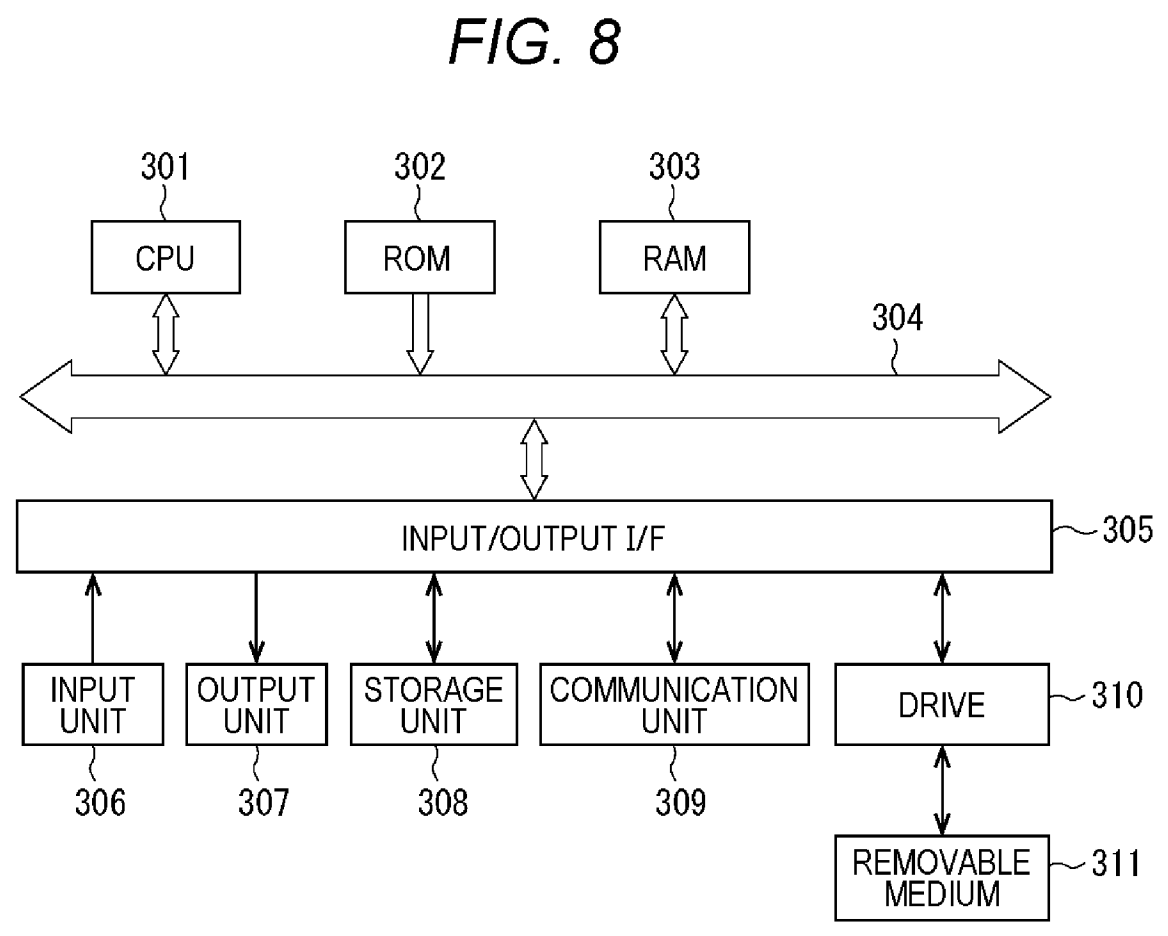

FIG. 8 is a block diagram illustrating a configuration example of hardware of a computer that executes the above-described series of processing using a program.

In the computer, a CPU 301, a read only memory (ROM) 302, and a random access memory (RAM) 303 are mutually connected by a bus 304.

Moreover, an input/output I/F 305 is further connected to the bus 304. An input unit 306, an output unit 307, a storage unit 308, a communication unit 309, and a drive 310 are connected to the input/output I/F 305.

The input unit 306 includes a keyboard, a mouse, a microphone, and the like. The output unit 307 includes a display, a speaker, and the like. The storage unit 308 includes a hard disk, a nonvolatile memory, and the like. The communication unit 309 includes a network interface or the like. The drive 310 drives a removable medium 311 such as a magnetic disk, an optical disk, a magneto-optical disk, or a semiconductor memory.

In the computer configured as described above, the CPU 301 loads a program, for example, stored in the storage unit 308 into the RAM 303 via the input/output I/F 305 and the bus 304 and executes the program, whereby the above-described series of processing is performed.

The program executed by the computer (CPU 301) can be provided by being recorded in the removable medium 311 as a package medium or the like, for example. Furthermore, the program can be provided via a wired or wireless transmission medium such as a local area network, the Internet, or digital satellite broadcasting.

In the computer, the program can be installed in the storage unit 308 via the input/output I/F 305 by attaching the removable medium 311 to the drive 310. Furthermore, the program can be received by the communication unit 309 via a wired or wireless transmission medium and installed in the storage unit 308. In addition, the program can be installed in the ROM 302 or the storage unit 308 in advance.

Note that the program executed by the computer may be a program in which processing is performed in time series in the order described in the present description, or may be a program in which processing is performed in parallel or at necessary timing such as when a call is made, or the like.

Note that the modes of the present disclosure are not limited to the above-described modes, and various modifications can be made in a range without departing from the gist of the present disclosure.

The effects described in the present description are merely examples and are not limited, and other effects may be provided.

Moreover, the present disclosure can also have the following configurations.

(1)
An image generation apparatus including:
an image generation unit that generates a plurality of simulation images in which a plurality of images having different accumulation times is reproduced on the basis of a physical quantity corresponding to light applied to an image sensor; and
an HDR synthesis unit that performs HDR synthesis on a plurality of the simulation images.

(2)
The image generation apparatus according to (1) in which the image generation unit generates a plurality of the simulation images on the basis of the physical quantity corresponding to one predetermined frame.

(3)
The image generation apparatus according to (1) in which the image generation unit generates a plurality of the simulation images on the basis of the physical quantity corresponding to each of frames at different timings.

(4)
The image generation apparatus according to any one of (1) to (3), in which the physical quantity is spectral irradiance.

(5)
The image generation apparatus according to any one of (1) to (4), in which the image generation unit includes a conversion unit that converts the physical quantity corresponding to a predetermined position of the image sensor into the number of photons.

(6)
The image generation apparatus according to (5), in which the image generation unit includes a multiplication unit that multiplies the number of photons by a transmittance of a color filter corresponding to each of pixels of the image sensor for each of the accumulation times.

(7)
The image generation apparatus according to (6), in which the image generation unit includes a wavelength range integration unit that integrates the number of photons for a predetermined wavelength range for each of the accumulation times.

(8)
The image generation apparatus according to (7), in which the image generation unit includes a photoelectric conversion unit that converts the number of photons into a charge amount for each of the accumulation times.

(9)
The image generation apparatus according to (8), in which the photoelectric conversion unit multiplies the number of photons integrated for a pixel area and the accumulation time by the quantum efficiency to calculate the charge amount for each of the pixels for each of the accumulation times.

(10)

The image generation apparatus according to (9), in which the photoelectric conversion unit adds a predetermined noise component to the charge amount calculated for each of the pixels.

(11)

The image generation apparatus according to (9) or (10), in which the image generation unit includes:

a voltage conversion unit that converts the charge amount for each of the pixels into a voltage value for each of the accumulation times; and an A/D conversion unit that generates the simulation image by converting the voltage value for each of the pixels into a digital value for each of the accumulation times.

(12)

The image generation apparatus according to (11), in which the voltage conversion unit adds a predetermined noise component to the voltage value converted for each of the pixels.

(13)

The image generation apparatus according to any one of (1) to (12), further including a gradation compression unit that, depending on a transmission band of an HDR image obtained by the HDR synthesis, performs gradation compression on the HDR image.

(14)

An image generation method in which an image generation apparatus executes processing of:

generating a plurality of simulation images in which a plurality of images having different accumulation times is reproduced on the basis of a physical quantity corresponding to light applied to the image sensor; and performing HDR synthesis on a plurality of the simulation images.

(15)

A program that causes a computer to execute processing of:

generating a plurality of simulation images in which a plurality of images having different accumulation times is reproduced on the basis of a physical quantity corresponding to light applied to the image sensor; and performing HDR synthesis on a plurality of the simulation images.

REFERENCE SIGNS LIST

1 Simulation system
10 Image sensor model
20 Three-dimensional rendering system
30 Simulation execution unit
51 Image generation unit
52 HDR synthesis unit
53 Gradation compression unit
71 Photon number conversion unit
72 CF transmittance multiplication unit
73 Wavelength range integration unit
74 Photoelectric conversion unit
75 Voltage conversion unit
76 A/D conversion unit

The invention claimed is:

1. An image generation apparatus, comprising:

a central processing unit (CPU) configured to:

generate a plurality of simulation images based on a physical quantity, wherein the plurality of simulation images includes a reproduction of a plurality of images, the plurality of images is associated with a plurality of accumulation times, and the physical quantity corresponds to an application of light on an image sensor; and the physical quantity corresponds to a specific position of the image sensor;

convert the physical quantity to a number of photons;

multiply, for each of the plurality of accumulation times, the number of photons by a plurality of transmittance values of a plurality of color filters, wherein each of the plurality of color filters corresponds to a respective pixel of a plurality of pixels of the image sensor;

integrate, for each of the plurality of accumulation times, the number of photons in a specific wavelength range;

convert, for each of the plurality of accumulation times, the number of photons into a respective charge amount;

integrate the number of photons for a pixel area and a specific accumulation time of the plurality of accumulation times;

multiply the integrated number of photons by a quantum efficiency;

calculate, based on the multiplication, the respective charge amount for each of the plurality of accumulation times, wherein the respective charge amount is associated with each of the plurality of pixels;

perform a high dynamic range (HDR) synthesis on the plurality of simulation images;

generate an HDR image based on the HDR synthesis on the plurality of simulation images;

determine a transmission band of the HDR image based on the HDR synthesis; and perform gradation compression on the HDR image based on the transmission band of the HDR image.

2. The image generation apparatus according to claim 1, wherein the CPU is further configured to generate the plurality of simulation images based on the physical quantity corresponding to a specific frame.

3. The image generation apparatus according to claim 1, wherein the CPU is further configured to generate the plurality of simulation images based on the physical quantity, the physical quantity corresponds to a plurality of frames, and each of the plurality of frames is at a respective timing of a plurality of timings.

4. The image generation apparatus according to claim 1, wherein the physical quantity is spectral irradiance.

5. The image generation apparatus according to claim 1, wherein the CPU is further configured to add a specific noise component to the respective charge amount of the each of the plurality of pixels.

6. The image generation apparatus according to claim 1, wherein the CPU is further configured to:

convert, for each of the plurality of accumulation times, the respective charge amount of each of the plurality of pixels into a respective voltage value;

convert, for each of the plurality of accumulation times, the respective voltage value of each of the plurality of pixels to a digital value; and generate, for each of the plurality of accumulation times, a simulation image of the plurality of simulation images based on the conversion of the respective voltage value of each of the plurality of pixels to the digital value.

7. The image generation apparatus according to claim 6, wherein the CPU is further configured to add a specific noise component to the respective voltage value of each of the plurality of pixels.

8. An image generation method, comprising:

in an image generation apparatus;

generating a plurality of simulation images based on a physical quantity, wherein the plurality of simulation images includes a reproduction of a plurality of images, the plurality of images is associated with a plurality of accumulation times, and the physical quantity corresponds to an application of light on an image sensor; and the physical quantity corresponds to a specific position of the image sensor;

converting the physical quantity to a number of photons;

multiplying, for each of the plurality of accumulation times, the number of photons by a plurality of transmittance values of a plurality of color filters, wherein each of the plurality of color filters corresponds to a respective pixel of a plurality of pixels of the image sensor;

integrating, for each of the plurality of accumulation times, the number of photons in a specific wavelength range;

converting, for each of the plurality of accumulation times, the number of photons into a respective charge amount;

integrating the number of photons for a pixel area and a specific accumulation time of the plurality of accumulation times;

multiplying the integrated number of photons by a quantum efficiency;

calculating, based on the multiplying, the respective charge amount for each of the plurality of accumulation times, wherein the respective charge amount is associated with each of the plurality of pixels;

performing a high dynamic range (HDR) synthesis on the plurality of simulation images;

generating an HDR image based on the HDR synthesis on the plurality of simulation images;

determining a transmission band of the HDR image based on the HDR synthesis; and performing gradation compression on the HDR image based on the transmission band of the HDR image.

9. A non-transitory computer-readable medium having stored thereon, computer-executable instructions which, when executed by a computer, cause the computer to execute operations, the operations comprising:

generating a plurality of simulation images based on a physical quantity, wherein the plurality of simulation images includes a reproduction of a plurality of images, the plurality of images is associated with a plurality of accumulation times, and the physical quantity corresponds to an application of light on an image sensor, and the physical quantity corresponds to a specific position of the image sensor;

converting the physical quantity to a number of photons;

multiplying, for each of the plurality of accumulation times, the number of photons by a plurality of transmittance values of a plurality of color filters, wherein each of the plurality of color filters corresponds to a respective pixel of a plurality of pixels of the image sensor;

integrating, for each of the plurality of accumulation times, the number of photons in a specific wavelength range;

converting, for each of the plurality of accumulation times, the number of photons into a respective charge amount;

integrating the number of photons for a pixel area and a specific accumulation time of the plurality of accumulation times;

multiplying the integrated number of photons by a quantum efficiency;

calculating, based on the multiplying, the respective charge amount for each of the plurality of accumulation times, wherein the respective charge amount is associated with each of the plurality of pixels;

performing a high dynamic range (HDR) synthesis on the plurality of simulation images;

generating an HDR image based on the HDR synthesis on the plurality of simulation images;

determining a transmission band of the HDR image based on the HDR synthesis; and performing gradation compression on the HDR image based on the transmission band of the HDR image.

* * * * *